United States Patent
Ikeda et al.

(10) Patent No.: US 6,906,911 B2
(45) Date of Patent: Jun. 14, 2005

(54) ELECTRIC DOUBLE LAYER CAPACITOR AND PROCESS FOR ITS PRODUCTION

(75) Inventors: Katsuji Ikeda, Kanagawa (JP); Yasuo Shinozaki, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 24 days.

(21) Appl. No.: 10/681,090

(22) Filed: Oct. 9, 2003

(65) Prior Publication Data

US 2004/0070921 A1 Apr. 15, 2004

(30) Foreign Application Priority Data

Oct. 9, 2002 (JP) ........................................ 2002-296583

(51) Int. Cl.[7] .............................. H01G 9/00; H01G 2/10
(52) U.S. Cl. ........................ 361/502; 361/503; 361/517
(58) Field of Search ................................ 361/502–506, 361/511–512, 517, 523, 530

(56) References Cited

U.S. PATENT DOCUMENTS

| | | | | |
|---|---|---|---|---|
| 5,142,451 A | * | 8/1992 | Kurabayashi et al. | 361/502 |
| 5,260,855 A | * | 11/1993 | Kaschmitter et al. | 361/502 |
| 5,786,980 A | * | 7/1998 | Evans | 361/502 |
| 6,430,031 B1 | * | 8/2002 | Dispennette et al. | 361/502 |

FOREIGN PATENT DOCUMENTS

| | | | |
|---|---|---|---|
| EP | 0 034 333 | 8/1981 | |
| EP | 1 096 521 | 5/2001 | |
| JP | 1-152715 | * 6/1989 | ............ H01G/9/00 |
| JP | 3-116707 | * 5/1991 | ............ H01G/9/00 |
| JP | 2001-44081 | 2/2001 | |
| JP | 2002-353078 | 12/2002 | |

OTHER PUBLICATIONS

Patent Abstracts of Japan, JP 2001–297952, Oct. 26, 2001.

* cited by examiner

Primary Examiner—Eric W. Thomas
(74) Attorney, Agent, or Firm—Oblon, Spivak, McClelland, Maier & Neustadt, P.C.

(57) ABSTRACT

An electric double layer capacitor includes, contained in a casing, an electrolyte, a positive electrode and a negative electrode each being an electrode containing carbon black, to form an electric double layer at the interface with the electrolyte, and a separator interposed between the positive electrode and the negative electrode. At least one electrode of the positive electrode and the negative electrode has protruded portions or bent portions formed continuously in the height direction against the bottom face of the casing. Further, a space due to the height of the protruded portions or the bent portions is formed between the at least one electrode and the separator.

11 Claims, 6 Drawing Sheets

Enlarged view

*1: Bottom face

ELECTRIC DOUBLE LAYER CAPACITOR AND PROCESS FOR ITS PRODUCTION

CROSS-REFERENCE To RELATED APPLICATIONS

The entire disclosure of Japanese Patent Application No. 2002-296583 filed on Oct. 9, 2002 including specification, claims, drawings and summary is incorporated herein by reference in its entirety.

BACKGROUND OF THE INVENTION

1. Field of the Invention

The present invention relates to an electric double layer capacitor and a process for its production. Particularly, it relates to an electric double layer capacitor whereby the internal resistance of the electric double layer capacitor can be made low, its capacitance density can be made high and its productivity can be satisfactorily maintained, and a process for producing such an electric double layer capacitor.

2. Discussion of the Background

An electric double layer capacitor is excellent in the power density and the long term reliability by charge/discharge cycles, and it is being used as a power source for hybrid electric cars, or as an emergency power source. In such an application as power sources, a high voltage at a level of a few hundreds V is required.

Usually, the operating voltage of a unit cell of an electric double layer capacitor is relatively low (at a level of up to 2.6 V). Accordingly, from a few tens to a few hundreds of such unit cells are used as connected in series to form an electric double layer module.

As the structure of such a unit cell, a rectangular cell or a cylindrical cell is common.

A perspective view illustrating the structure of a rectangular cell (partially cut) is shown in FIG. 7.

As shown in FIG. 7, a rectangular cell 20A is one wherein a plurality of flat plate positive electrodes 1A and negative electrodes 1B are alternately stacked with a separator 2 interposed therebetween to form a rectangular element assembly 3, which is contained in a rectangular casing 5.

Further, from positive electrodes 1B and negative electrodes 1B, flat plate lead portions 7A and 7B extend upwardly, respectively, and they are respectively bundled into lead connecting portions 8A and 8B as divided into a positive electrode and a negative electrode. The lead connecting portions 8A and 8B are connected to a positive electrode terminal 9A and a negative electrode terminal 9B passing through and fixed to the rectangular casing 5.

On the other hand, a perspective view illustrating the structure of a cylindrical cell (partially cut) is shown in FIG. 8.

As shown in FIG. 8, a cylindrical cell 20B is constituted in such a manner that a pair of long strip-shaped positive electrode 11A and negative electrode 11B are wound up with a separator 12 interposed therebetween to form a wound element assembly 13, which is contained in a cylindrical casing 15.

Further, leads 17A and 17B are connected to the upper ends of the positive electrode 11A and negative electrode 11B, and these leads 17A and 17B are, respectively, connected to a positive electrode terminal 19A and a negative electrode terminal 19B passing through and fixed to a sealing insulation plate 16.

Unit cells 20A and 20B thus constituted, are, respectively, designed so that, for example, a plurality of them are connected in series to constitute an electric double layer module.

A perspective view illustrating an embodiment of such an electric double layer module structure, is shown in FIG. 9.

As shown in FIG. 9, the electric double layer module 25 is constituted by solid module structural members 21 to integrally secure a plurality of unit cells 20 (cylindrical cells 20B) and many connecting bus bar members 23 to electrically connect the unit cells 20 in series.

Further, another structure of an electric double layer module 25 may be one as shown in JP-A-2002-353078 wherein electrodes constituting the positive electrode 11A and the negative electrode 11B, etc. are specially designed so that the cylindrical casing 15 of unit cells 20, the module structural members 21 and the connecting bus bar members 23 are integrated to make the electric double layer module 25 compact and light in weight.

Of such a electric double layer capacitor for large capacitance and large current charging/discharging, it is desired to further reduce the internal resistance and to increase the capacitance per unit volume (hereinafter referred to as the capacitance density).

Accordingly, it is conceivable to enlarge the surface area of the electrode and to reduce the thickness of the separator 2 or 12 as far as possible.

However, in such a case, the following structural problem is likely to result.

For example, the separator 2 or 12 is required to have the porosity set to be high to some extent from the viewpoint of absorption and retention of the electrolyte. Here, the porosity is the proportion of the volume occupied by voids (bubbles present in the object) in the volume of the object.

Therefore, if it is attempted to reduce the thickness of the separator 2 or 12, while maintaining the porosity to be high to some extent, the insulation between the positive electrode 11A and the negative electrode 11B tends to be inadequate, whereby the positive electrode 11A and the negative electrode 11B tends to undergo microscopic short circuiting, thus leading to self-discharge or a decrease in the production yield of the capacitor.

Further, if the thickness of the separator 2 or 12 is made too thin (e.g. at most 60 μm), it tends to be difficult to increase the porosity of the separator 2 or 12, whereby the amount of the electrolyte in the separator 2 or 12 tends to be small, whereby it tends to be difficult to supply the electrolyte to the positive electrode 11A and the negative electrode 11B sufficiently.

Consequently, no adequate electrolyte will be supplied to the positive electrode 11A and the negative electrode 11B, whereby no adequate amount of ions will be present in the vicinity of the positive electrode 11A and the negative electrode 11B, and at the time of discharge, the voltage drop is likely to be substantial due to instantaneous large current discharge.

Further, as no adequate electrolyte will be supplied to the positive electrode 11A and the negative electrode 11B, polarization of ions tends to be inadequate at the positive electrode 11A and the negative electrode 11B during the charge, whereby the voltage retention property is likely to be low. Further, no adequate adsorption of ions required for the external applied voltage for charging against the positive electrode 11A and the negative electrode 11B will be carried out, whereby an electrochemical decomposition reaction or the like other than the adsorption will take place at the positive electrode 11A and the negative electrode 11B, whereby the internal resistance is likely to increase, or the capacitance density is likely to decrease.

Further, if it is attempted to supply the electrolyte sufficiently to the positive electrode 11A and the negative electrode 11B to solve such problems, it takes time for injection of the electrolyte, thus leading to a problem in the productivity of the electric double layer capacitor.

As a method for supplying an electrolyte sufficiently to the electrodes, for example, JP-A-2001-44081 proposes a method wherein a groove is formed on the surface of the electrodes to maintain the electrolyte in the vicinity of the electrodes in an amount corresponding to the amount of the electrolyte expected to be dried up during the use.

However, this method is limited to maintain the electrolyte in an amount corresponding to the amount to be dried up, and, for example, in a case where the thickness of the separator 2 or 12 is made thin, no adequate amount of the electrolyte required for the polarization of ions, can be maintained in the separator 2 or 12.

SUMMARY OF THE INVENTION

The present invention has been made in view of such conventional problems, and it is an object of the present invention to provide an electric double layer capacitor whereby the internal resistance of the electric double layer capacitor can be reduced, its capacitance density can be made high, and its productivity can be satisfactorily maintained, and a process for producing such an electric double layer capacitor.

Namely, the present invention provides an electric double layer capacitor having contained in a casing an electrolyte, a positive electrode and a negative electrode each being an electrode containing carbon black, to form an electric double layer at the interface with the electrolyte, and a separator interposed between the positive electrode and the negative electrode, wherein at least one electrode of the positive electrode and the negative electrode has protruded portions or bent portions formed continuously in the height direction against the bottom face of the casing, and a space due to the height of the protruded portions or the bent portions is formed between said at least one electrode and the separator.

When impregnated with an electrolyte, electrodes usually expand beyond the thicknesses before impregnation. Consequently, impregnation of the electrolyte to the electrodes is likely to be inadequate, and no adequate performance of the electric double layer capacitor is likely to be performed. Whereas, on the electrode of the present invention, protruded portions or bent portions are formed continuously in the height direction against the bottom face of the casing, whereby a space due to the height of the protruded portions or the bent portions is formed between the separator and the electrode, and thus, the impregnation paths for the electrolyte to the electrode are secured.

Thus, it is possible to lower the internal resistance of the electric double layer capacitor and to increase its capacitance density, and it is possible to maintain its productivity satisfactorily.

Further, with respect to the electric double layer capacitor of the present invention, it is preferred that a plurality of such positive electrodes and negative electrodes are alternatively stacked with the separator between them, or the positive electrode and the negative electrode each having a long strip shape, are wound with the separator between them, and contained in the casing having a bottomed cylindrical or rectangular shape.

Thus, it is possible to construct a rectangular or cylindrical electric double layer capacitor having a large capacitance by containing the positive electrode, the negative electrode and the separator in the casing.

Further, with respect to the electric double layer capacitor of the present invention, it is preferred that the protruded portions or the bent portions are ones having said at least one electrode deformed on one side or both sides, and they are formed in a plurality at every predetermined distance in a direction perpendicular to the height direction. By this construction, the electrolyte will readily be impregnated to the entire electrodes.

Further, with respect to the electric double layer capacitor of the present invention, it is preferred that the electrode is one comprising a metal current collector and an electrode sheet containing a carbonaceous material as the main component and having a thickness of from 80 to 400 $\mu$m, bonded with an adhesive layer to at least one side of the metal current collector. It is further preferred that the above-mentioned electrode sheet is bonded to each side of the metal current collector, and the protruded portions or the bent portions are formed to protrude or bend alternately on both sides of the electrode. By this construction, the electrolyte can sufficiently be supplied to the front and back sides of the electrode.

Further, with respect to the electric double layer capacitor of the present invention, it is preferred that the separator has a thickness of from 10 to 60 $\mu$m, a porosity of from 40 to 85% and the maximum pore size of at most 1 $\mu$m as measured by the test method prescribed in JIS K3832.

If the thickness of the separator is less than 10 $\mu$m, the amount of the electrolyte which can be maintained in the separator tends to be inadequate, whereby the internal resistance is likely to increase, and because of its thinness, short-circuiting between electrodes is likely to result. On the other hand, if the thickness of the separator exceeds 60 $\mu$m, such tends to hinder the high capacitance densification of the cell. Accordingly, the thickness of the separator is preferably from 10 to 60 $\mu$m. More preferably, the thickness of the separator is from 20 to 50 $\mu$m.

Further, if the porosity of the separator exceeds 85%, the separator itself tends to be undurable against expansion of the electrodes, whereby short-circuiting is likely to result between the electrodes. On the other hand, if the porosity of the separator is less than 40%, the amount of the electrolyte in the separator tends to be small, whereby the internal resistance is likely to be too high. Accordingly, the porosity of the separator is preferably from 40 to 85%.

Further, in the electric double layer capacitor of the present invention, the electrodes will expand by impregnation of the electrolyte and/or by at least one charging operation which will be described hereinafter, whereby the separator will be compressed, and the electrolyte in the electrodes will be squeezed out, whereupon the internal resistance is likely to further increase. Accordingly, the porosity of the separator is more preferably at least 50% and less than 80%.

Further, if the maximum pore size as prescribed in JIS K3832, of the separator, exceeds 1 $\mu$m, the electrodes are likely to penetrate through the separator to cause short-circuiting, or metal impurities contained in the electrodes are likely to precipitate to cause microscopic short-circuiting. Accordingly, the maximum pore size is preferably at most 1 $\mu$m. More preferably, the average pore size as prescribed in JIS K3832, of the separator, is from 0.1 to 0.3 $\mu$m.

Further, the present invention provides a process for producing an electric double layer capacitor, which comprises a step of forming a positive electrode and a negative electrode each being an electrode containing carbon black, to form an electric double layer at the interface with an electrolyte, a step of forming protruded portions or bent portions on at least one electrode of the positive electrode and the negative electrode, a step of interposing a separator between the positive electrode and the negative electrode to form an element, a step of containing the element in a casing, a step of impregnating the element with an electrolyte, and at least one charging operation, in this order, wherein a space due to the height of the protruded portions or the bent portions is formed between said at least one electrode and the separator.

By this construction, a space due to the height of the protruded portions or the bent portions is formed between said at least one electrode and the separator, and impregnation paths of the electrolyte to the electrode can be secured, whereby it is possible to prepare an electric double layer capacitor having a low internal resistance and high capacitance.

Further, with respect to the process for producing an electric double layer capacitor of the present invention, it is preferred that the electrode is formed by bonding with an adhesive layer an electrode sheet containing a carbonaceous material as the main component and having a thickness of from 80 to 400 $\mu$m, on at least one side of a metal current collector, the protruded portions or the bent portions are formed so that the sum of the thickness of the electrode and the height of the protruded portions or the bent portions becomes to be from 1.01 to 1.20 times the thickness of the electrode comprising the sum of the thicknesses of the metal current collector, the electrode sheet and the adhesive layer, and the protruded portions and the bent portions are formed at a distance of at most 20 mm in a direction perpendicular to the height direction of the casing.

In order to secure a large capacitance of the electrodes, the electrodes are preferably ones containing a carbonaceous material as the main component. Further, in order to sufficiently secure the electrical conductivity, it is necessary to incorporate carbon black in the electrode sheet.

By this construction, ions in an amount required for polarization can be secured in the electrodes, and the electrolyte-retention property can be improved.

Further, if the thickness of the electrode sheet is less than 80 $\mu$m, the space between the separator and the electrode due to the protruded portions or the bent portions tends to be too wide relative to the thickness of the electrode. Accordingly, a vacant distance between the electrode will be substantial, thus hindering reduction of the resistance of the electric double layer capacitor or leading to a decrease of the capacitance density. On the other hand, if the thickness of the electrode sheet exceeds 400 $\mu$m, the space formed between it and the separator is likely to be reduced by the self expansion. Accordingly, impregnation paths of the electrolyte to the electrodes are likely to be closed, and no adequate supply of the electrolyte to the electrodes will be possible, such being undesirable. Thus, the thickness of the electrode sheet is preferably from 80 to 400 $\mu$m.

Further, if the sum of the thickness of this electrode and the height of the protruded portions or the bent portions is less than 1.01 times to the thickness of the electrode, the space between the separator and the electrode tends to be inadequate, whereby the impregnation of the electrolyte to the electrode tends to be low. On the other hand, if it exceeds 1.20 times, the distance between the electrodes tends to be so much that the internal resistance tends to be high, or the capacitance density is likely to decrease. Accordingly, the sum of the thickness of the electrode and the height of the protruded portions or the bent portions is preferably from 1.01 times to 1.20 times to the thickness of the electrode.

Further, if the distance between the protruded portions or between the bent portions is larger than 20 mm, the space between the separator and the electrode tends to be closed down, and no adequate amount of the electrolyte tends to be supplied to the electrodes. Accordingly, it is preferred that the protruded portions or the bent portions are formed at a distance of at most 20 mm. More preferably, this distance is at most 15 mm.

Further, if the distance between the protruded portions or between the bent portions is less than the thickness of the electrode, processing to provide the distance between the protruded portions or between the bent portions itself tends to be difficult, and such being not practical. Accordingly, it is preferred that the protruded portions or the bent portions are provided at a distance wider than the thickness of the electrode.

Further, with respect to the process for producing an electric double layer capacitor of the present invention, it is preferred that the thickness of the electrode expands by from 1.1 times to 1.6 times by the step of impregnating the electrolyte and the charging operation.

If the expansion of the thickness of the electrode is less than 1.1 times, an excess space tends to form between the electrode and the separator even after impregnation of the electrolyte, etc., which is likely to hinder reduction of the resistance. On the other hand, if the thickness of this electrode expands beyond 1.6 times, the space between the separator and the electrode tends to be closed down during the preparation of the electric double layer capacitor, whereby no adequate amount of the electrolyte tends to be supplied to the electrode. Further, the separator tends to be not durable against the expansion of the electrode, whereby short-circuiting is likely to take place between the electrodes. Accordingly, it is preferred that the thickness of the electrode expands by from 1.1 to 1.6 times by the step of impregnating the electrolyte and at least one charging operation. More preferably, this expansion is from 1.15 to 1.5 times.

DESCRIPTION OF THE PREFERRED EMBODIMENTS

Now, the preferred embodiments of the present invention will be described with reference to the drawings. Various members constituting the electric double layer capacitors according to the embodiments of the present invention will be described. In the following description, various members will be described with reference to those to be used for a cylindrical cell.

Firstly, the electrode will be described. A cross-section of the electrode is shown in FIG. 1.

Figure 1:
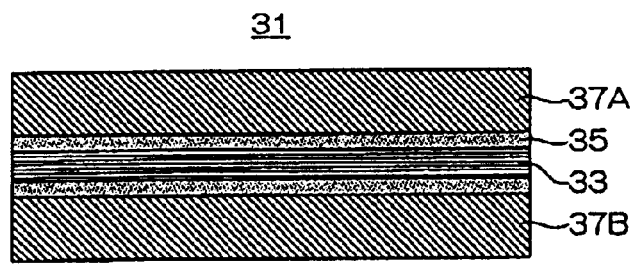
FIG. 1 is a cross-sectional view of an electrode as an embodiment of the present invention.

In FIG. 1, an electrode 31 has a structure in which electrode sheets 37A and 37B are bonded to both sides of a metal current collector foil 33 of a band or strip shape, with an adhesive layer 35. The electrode 31 may be prepared by bonding an electrode sheet 37A only on one side of the metal current collector foil 33 with an adhesive layer 35. However, it is preferred to prepare it by bonding electrode sheets 37A and 37B on both sides of the metal current collector foil 33, to facilitate high capacitance of the cell.

This metal current collector foil 33 is not particularly limited so long as it is excellent in electrochemical corrosion resistance on the positive electrode side, and a foil, net or the like of aluminum, stainless steel or the like may be used. However, one composed mainly of aluminum is preferred, since it is light in weight and has low resistance, and even when it is rolled into a thin foil, it has sufficient strength and is electrochemically stable.

Further, the thickness of the metal current collector foil 33 is made as thin as possible within a range where the strength allows, and it is usually preferably within a range of from 20 to 100 $\mu$m. Further, for the purpose of reducing the bonding resistance or improvement of the bonding strength with the electrode sheets 37A and 37B, chemical, electrochemical or mechanical surface etching treatment may be applied.

Further, the metal current collector foil 33 has an end strip portion not shown, where the electrode sheets 37A and 37B are not bonded, and this end strip portion is to take an electrical connection with the exterior. Accordingly, in order to increase the cell capacitance, the end strip portion should better be as narrow as possible, and is preferably from about 2 to 6 mm.

The electrode sheets 37A and 37B contain a carbonaceous material as the main component and contain carbon black. And, the electric double layer capacitor is based on a principle such that an electric charge is accumulated in the electric double layer formed at the interface between the electrode and the electrolyte.

Accordingly, in order to increase the capacitance of the electric double layer capacitor, the specific surface area of the carbonaceous material is preferably as large as possible, and it is preferred to use a carbonaceous material having a specific surface area of from 100 to 2,500 m$^2$/g as the main component. The carbonaceous material may, for example, be activated carbon, carbon black, polyacene or carbon aerogel.

Further, as carbon black, one having high electrical conductivity and large oil absorptivity, such as Ketjenblack, is used particularly preferably. The content of carbon black in the electrode sheets 37A and 37B is preferably made to be from 5 to 30 mass % in the total amount of the carbonaceous material and the binder. If the content of carbon black is less than 5 mass %, it tends to be difficult to maintain the electrolyte sufficiently, and it tends to be difficult to supply ions in an amount necessary for polarization. On the other hand, if the content of carbon black exceeds 30 mass %, the electrodes are likely to expand too much by impregnation of the electrolyte, such being undesirable.

The adhesive layer 35 is one to be used to bond the electrode sheets 37A and 37B to the metal current collector foil 33. Accordingly, it is required to have a sufficient adhesive property and high electrical conductivity. Further, the adhesive layer 35 is required to have heat resistance sufficiently durable against drying at the time of removing moisture from the electrode 31, and at the same time, it is required to be stable against the electrolyte to be used in the present invention and to be electrochemically stable within the voltage range in which the electric double layer capacitor is used.

Accordingly, an electrically conductive adhesive is preferably used in which graphite or carbon black is dispersed as an electroconductive material, using a polyamideimide resin, a polyvinylidene fluoride, a polytetrafluoroethylene, a polyimide resin or the like as the binder. Further, the electrode 31 of the present invention may be prepared also by coating an electrode material containing a carbonaceous material as the main component, on a metal current collector foil 33. However, from the viewpoint of efficient processability, the above-mentioned method of bonding the electrode sheets 37A and 37B to the metal current collector 33 with the adhesive layer 35, is more preferred.

Now, the electrolyte will be described.

The electrolyte to be used for the electric double layer capacitor includes an aqueous electrolyte and a non-aqueous electrolyte. Here, the withstand voltage of a unit cell in a case where the aqueous electrolyte is used, is about 0.8 V, and the withstand voltage in a case where the non-aqueous electrolyte is used, is about 2.6 V. The electrostatic energy of an electric double layer capacitor is proportional to the square of the withstand voltage. Accordingly, when a non-aqueous electrolyte is used, the electrostatic energy can be made larger by at least 10 times than when an aqueous electrolyte is used. Accordingly, in the present invention, a non-aqueous electrolyte is preferred from the viewpoint of the energy density.

The solute contained in the non-aqueous electrolyte is preferably a quaternary onium salt from the viewpoint of the electrical conductivity, the solubility in a solvent and the electrochemical stability.

Particularly preferred is either one or a mixture of two or more of salts comprising a quaternary onium cation represented by $R^1R^2R^3R^4N^+$ or $R^1R^2R^3R^4P^+$ (wherein each of $R^1$, $R^2$, $R^3$ and $R^4$ which are independent of one another, is a $C_{1-6}$ alkyl group), or as a cyclic quaternary nitrogen compound, an imidazolium cation represented by $R^1R^2C_3H_3N_2^+$ (wherein each of $R^1$ and $R^2$ which are independent of each other, is a $C_{1-6}$ alkyl group) or a morpholinium cation represented by $R^1R^2C_4H_8ON^+$ (wherein each of $R^1$ and $R^2$ which are independent of each other, is a $C_{1-6}$ alkyl group), and an anion such as $BF_6^-$, $PF_6^-$, $CF_3SO_3^-$, $AsF_6^-$, $N(SO_2CF_3)_2^-$ or $ClO_4^-$. More preferred is an ammonium salt wherein at least one of $R^1$, $R^2$, $R^3$ and $R^4$ is different, or an imidazolium salt wherein $R^1$ and $R^2$ are different.

Further, it is possible to use a salt containing no solvent, i.e. a molten salt, in a case where the temperature range in which the electric double layer capacitor is used, is limited to some extent, or in a case where ion conductivity is shown in such a practical temperature range. For example, an imidazolium salt such as $(C_2H_5)(CH_3)C_2H_3N_2N(SO_2CF_3)_2$ is in a molten state at room temperature and exhibits an ion conductivity. Accordingly, even when this is used as the electrolyte, such a construction will function as an electric double layer capacitor of the present invention.

Further, in a case where an organic solvent is used to dissolve the solute, it is preferred to use a cyclic carbonate such as ethylene carbonate, propylene carbonate or butylene carbonate, a nitrile such as acetonitrile, a chain carbonate such as dimethyl carbonate, ethylmethyl carbonate or diethyl carbonate, sulfolane or a sulfolane derivative. Particularly preferred is at least one member selected from the group consisting of propylene carbonate, ethylene carbonate, dimethyl carbonate, diethyl carbonate, methylethyl carbonate, acetonitrile, sulfolane and methylsulfolane.

Now, the separator will be described.

The separator 12 electrically insulates a positive electrode 51A and a negative electrode 51B which are described hereinafter, while it facilitates movement of ions in the electrolyte and in the positive electrode 51A and the negative electrode 51B, which takes place along charging or discharging.

Accordingly, it is preferred to employ e.g. a polyethylene porous film, a polypropylene porous film, a polyethylene non-woven fabric, a polypropylene non-woven fabric, a polyester non-woven fabric, a cellulose paper, a craft paper, a rayon fiber/sisal fiber blend sheet, a Manila hemp sheet, a polyester fiber sheet or a glass fiber sheet, having ion permeability.

Further, the positive electrode 51A and the negative electrode 51B will usually expand in the process of being impregnated with the electrolyte, and at least one charging operation. Accordingly, the separator 12 is preferably one having a strength durable against the pressure due to this expansion and being capable of maintaining the electrolyte and having stretchability so that it will not break even in a stretched state.

In the process of being impregnated with the electrolyte and in the case when the positive electrode 51A and the negative electrode 51B are expanded to a thickness of at least 1.2 times by at least one charging operation, particularly preferred is a porous film of ultrahigh molecular weight polyethylene having a high porosity of from 70 to 85% and excellent in elongation at berakage, a porous film of ultra-high molecular weight polyethylene having inorganic particles packed, a polyester non-woven fabric made of a polyethylene terephthalate fiber or polybutylene terephthalate, or a sheet having inorganic particles packed therein. Also, when the positive electrode 51A and the negative electrode 51B are expanded to a thickness of at least 1.1 times and less than 1.2 times, it is preferable to use a cellulose paper as a separator, which is excellent in denseness and has a maximum pore size of at most 1 µm defined in accordance with JIS K3832, even if it is thin film-like. Particularly, it is preferable to use a cellulose paper separator prepared from solvent-spinned rayon.

Figure 2:
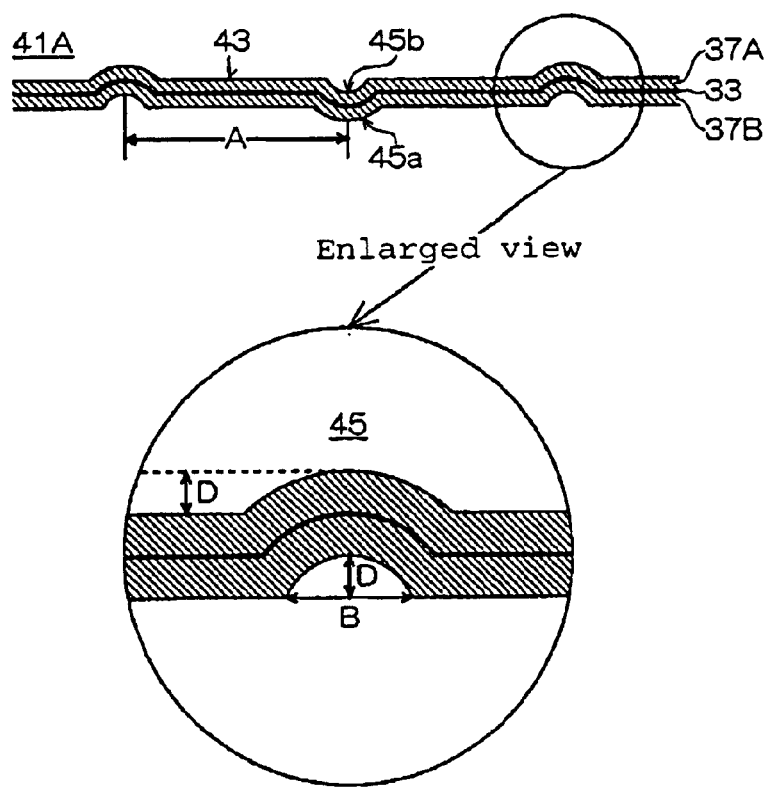
FIG. 2 is a cross-sectional view of a processed electrode as an embodiment of the present invention.

Now, the processed electrode will be described. A cross-sectional view of the processed electrode is shown in FIG. 2. Here, the same elements as in FIG. 1 are identified by the same symbols, and their description will be omitted.

In FIG. 2, a processed electrode 41A is modified so that, against the electrode 31, it has a long strip shape strip portion, 43 similar to the conventional one and protruded portions each having a convex portion 45a and a concave portion 45b.

In the after-mentioned wound type element assembly 53, the convex portion 45a is one formed to provide a prescribed space D between the separator 12 and the strip portion 43, and the metal current collector foil 33, the electrode sheets 37A and 37B, etc. constituting the processed electrode 41A are integrally raised by the space D.

On the other hand, the concave portion 45b is one formed as a result of such that at the time of forming the convex portion 45a, the constituting members of the processed electrode 41a were integrally raised, and the cross-sectional shape of this concave 45b is a shape along the periphery of the prescribed semiellipse (the long diameter corresponds to the width B, and a half of its short diameter corresponds to the depth D).

And, the deformation of such convex 45a and concave 45b (hereinafter, both may be altogether referred to as a convexoconcave portion 45) continuously extends vertically from the front side to the rear side of the paper plane in the FIG. of the processed electrode 41 A.

Accordingly, the convexoconcave portion 45 of the processed electrode 41A can be formed, for example, by pressing the electrode 31 against the side surface of an elliptic cylindrical rod having a prescribed elliptic cross-section.

Further, the convexoconcave portions 45 alternately have convex portions 45a/concave portions 45b directed to upward/downward in the FIG., and the space between the adjacent convex portion 45a and concave portion 45b has a distance A. Here, the distance A represents the distance between the adjacent two protruded portions and corresponds to the distance from the most raised portion of the convex 45a to the most recessed portion of the adjacent concave portion 45b. By this construction, a space D from the separator 12 is formed on the front and rear sides of the processed electrode 41A, whereby the electrolyte becomes to be readily impregnated to the processed electrode 41A, such being preferred since the electrolyte can sufficiently be supplied to the front and rear sides of the electrode 31 especially in a case where the electrode sheets 37A and 37B are bonded on both sides of the metal current collector foil 33 as shown in FIG. 2.

Further, the cross-sectional shape of the concave portion 45b is not limited to the above-described case where it is a shape along the periphery of the prescribed semiellipse, and it may be a shape along an angular side. Further, so long as it is continuous in the height direction against the bottom face of the casing, it is not limited to the above-mentioned shape perpendicular to the paper face and may, for example, be an oblique line shape.

Figure 3:
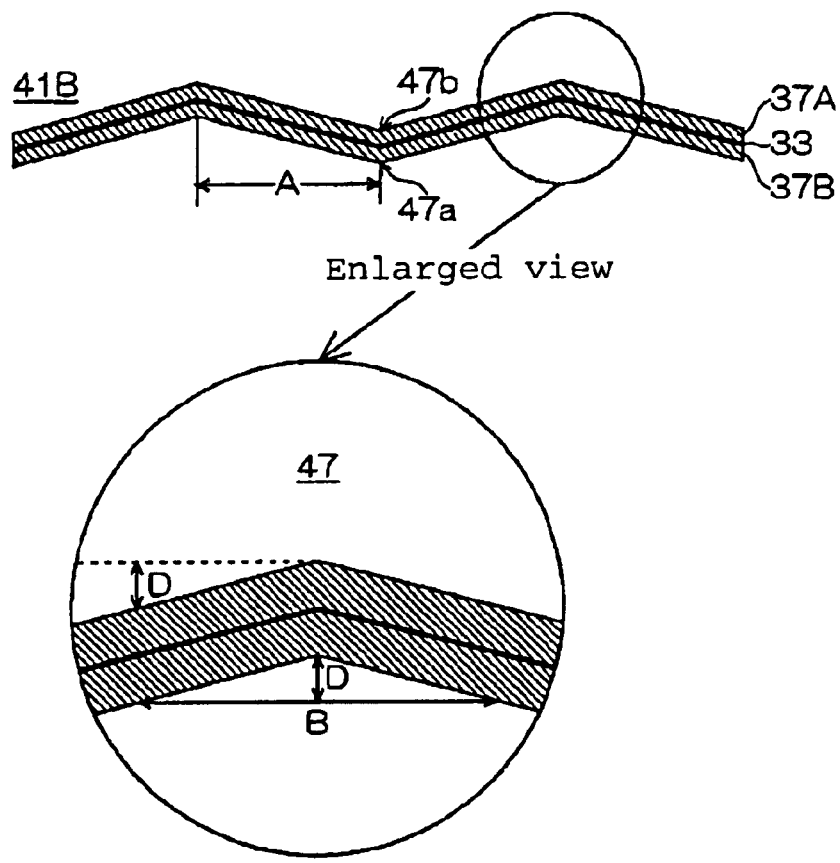
FIG. 3 is a cross-sectional view of a processed electrode as another embodiment of the present invention.

A cross-sectional view of another embodiment of this processed electrode is shown in FIG. 3. Here, the same elements as in FIG. 2 are identified by the same symbols, and their description will be omitted.

In FIG. 3, the cross-sectional shape of the concave 47b of the processed electrode 41B has a shape along two sides other than the bottom of the prescribed isosceles triangle (the bottom being width B, and the height being D). Further, the processed electrode 41B is constituted solely by a convexoconcave portion 47 without being provided with a portion corresponding to the strip portion 43 of the processed electrode 41A.

Accordingly, in other words, the processed electrode 41B can be said to be one having the electrode 31 (simply) deformed to have prescribed bent portions. Accordingly, the processed electrode 41B can be formed, for example, by pressing the electrode 31 to an angular hard plate having the prescribed isosceles triangle.

By this construction, the processed electrode 41B is also capable of forming a space D on average between it and the separator 12 on its front and rear sides.

Further, in the following, the processed electrode 41A and the processed electrode 41B are commonly referred to as a processed electrode 41.

Figure 4:
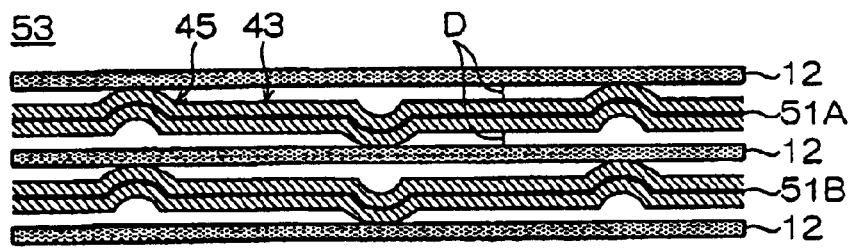
FIG. 4 is a cross-sectional view of a wound element assembly as an embodiment of the present invention.
Figure 5:
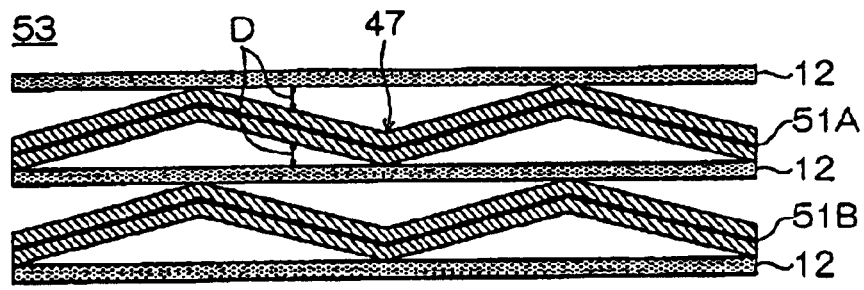
FIG. 5 is a cross-sectional view of a wound element assembly as another embodiment of the present invention.
Figure 8:
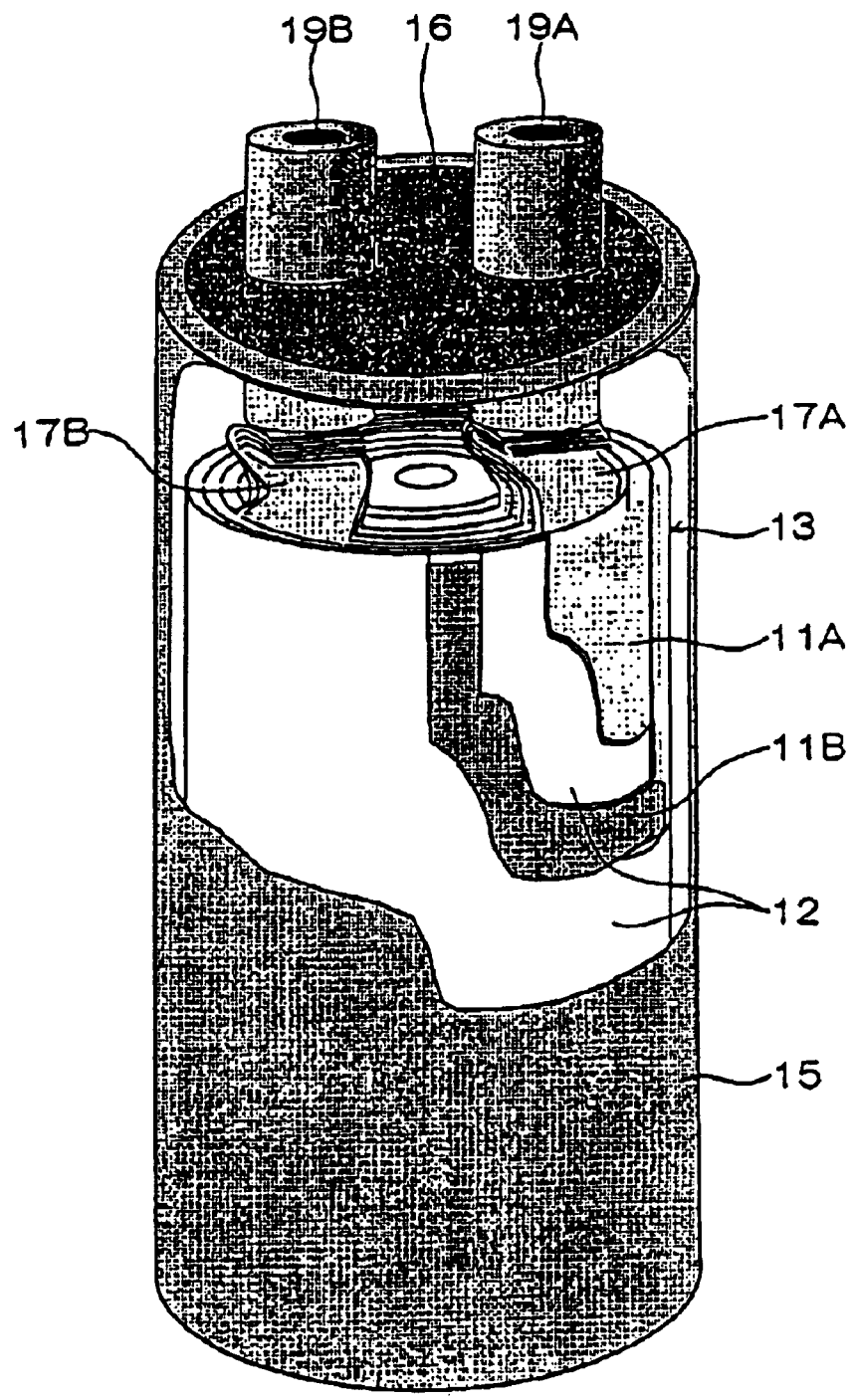
FIG. 8 is a perspective view showing the structure of a cylindrical cell partially cut.
Figure 9:
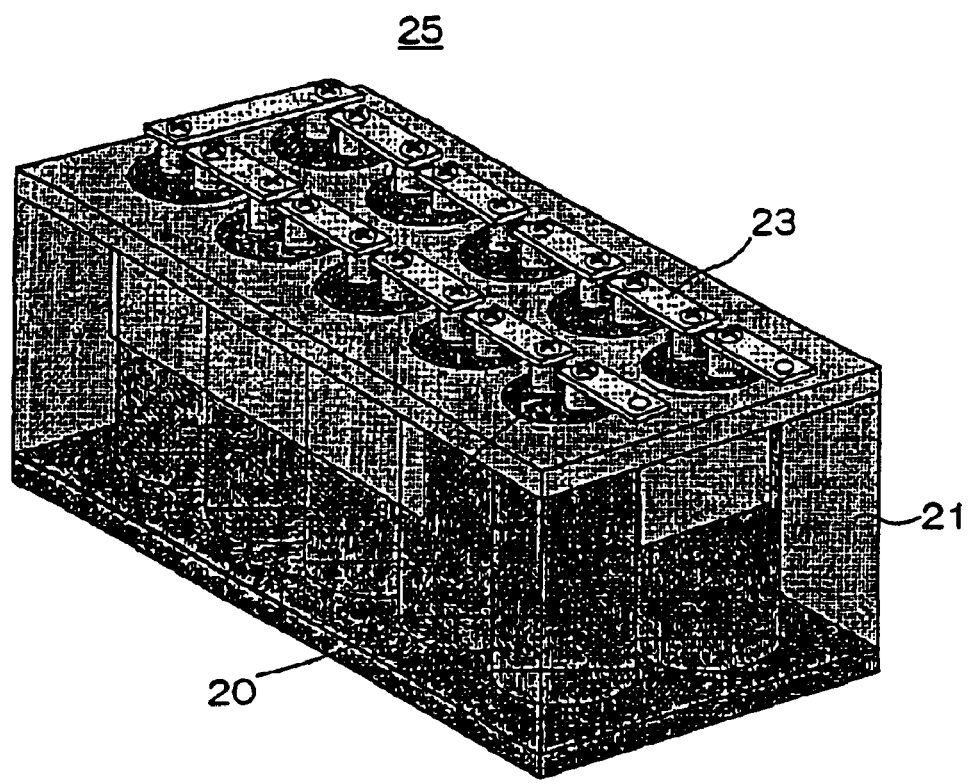
FIG. 9 is a perspective view illustrating an embodiment of the structure of a high pressure power source module.

Now, the wound element assembly will be described. Cross-sectional views of the wound element assemblies are shown in FIGS. 4 and 5. The same elements as in FIGS. 2, 3 and 8 are identified by the same symbols, and their descriptions will be omitted.

Here, the cross-sectional view of the wound element assembly shown in FIG. 4 corresponds to the processed electrode 41A shown in FIG. 2, and the cross-sectional view of the wound element assembly shown in FIG. 5 corresponds to the processed electrode 41B shown in FIG. 3.

In each of FIGS. 4 and 5, the wound element assembly 53 is constituted by a positive electrode 51A and negative electrode 51B using the processed electrode 41, as is different from the wound element assembly 13 using conventional long strip shaped positive electrode 11A and negative electrode 11B. The processed electrode 41 may be used for either one of the positive electrode 51A and the negative electrode 51B. However, it is preferred to use it for each of the positive electrode 51A and the negative electrode 51B, whereby the electrolyte can better be maintained.

And, the wound element assembly 53 is formed by sandwiching a separator 12 by the positive electrode 51A and the negative electrode 51B and winding them up by a winding core not shown.

At that time, the processed electrodes 41 constituting the positive electrode 51A and the negative electrode 51B are arranged and wound up so that "from the front to the rear direction in the FIG." being a direction in which the deformation of the convexoconcave portions 45 or 47 extends, corresponds to the winding axis direction of the wound element assembly 53 (the height direction against the bottom of the casing), so that "upward/downward in the FIG." being the direction of the convex 45a/the concave 45b or the convex 47a/the concave 47b, corresponds to the winding diameter direction (the direction parallel with the bottom of the casing), and so that "a left/right direction in the FIG." being the direction of the distance A of the convexoconcave portions 45 or 47, corresponds to the rolling direction of the winding (the direction perpendicular to the height direction against the bottom of the casing).

Accordingly, between the separator 12 and the positive electrode 51A or the negative electrode 51B, a space D is formed continuously over the entirety in the axis direction of the winding of the wound element assembly 53. By this construction, impregnation paths of the electrolyte can be secured over the entire axis direction of the winding.

Figure 6:
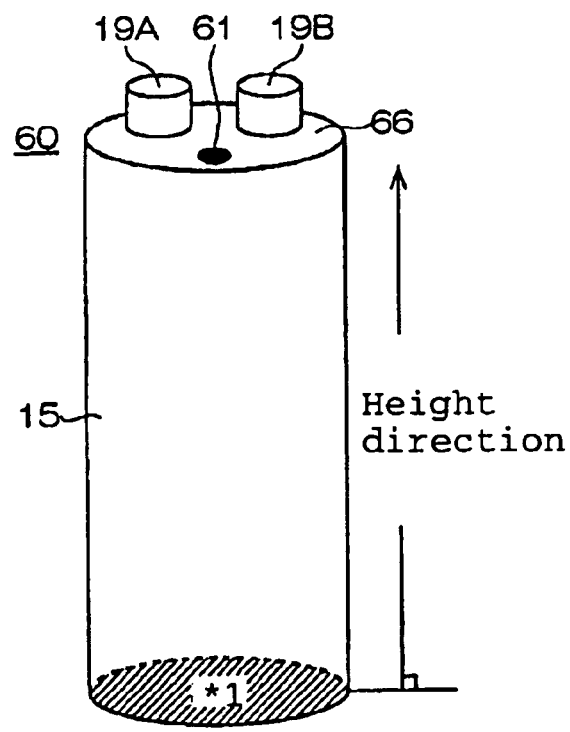
FIG. 6 is a perspective view of a cylindrical cell as an embodiment of the present invention.
Figure 7:
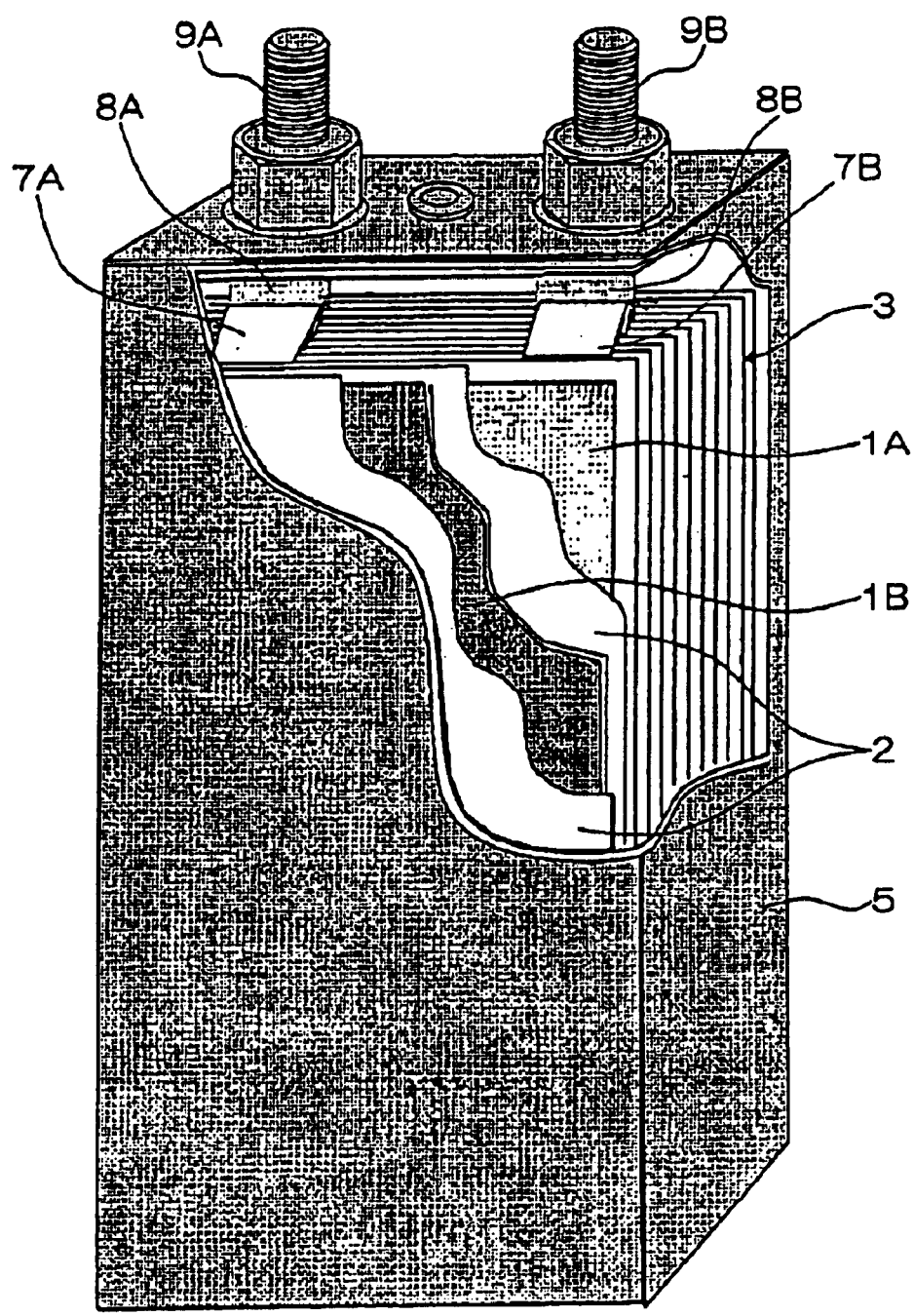
FIG. 7 is a perspective view illustrating the structure of a rectangular cell partially cut.

Now, the cylindrical cell will be described. A perspective view of the cylindrical cell is shown in FIG. 6. Here, the same elements as in FIGS. 4 and 8 are identified by the same symbols, and their description will be omitted.

In FIG. 6, a cylindrical cell 60 is constituted by having the wound element assembly 53 contained therein, although not shown.

This wound element assembly 53 is contained so that the height direction against the bottom of the cylindrical casing 15 corresponds to the axis direction in the same manner as in the conventional structure.

Further, to this wound element assembly 53, leads 17A and 17B are connected to perform electrical connection to the exterior, respectively, to the respective end strip portions of the metal current collector foils 33 of the positive electrode 51A and the negative electrode 51B.

Here, the method for connecting the end strip portions and the leads 17A and 17B may be electroconductive bonding by mechanical pressing or by a conductive adhesive, but is preferably a welding method which is mechanically and electrically highly reliable. For such a welding method, an ultrasonic welding, a laser welding by YAG or an electron beam welding method is suitably employed.

For the leads 17A and 17B, the material is not particularly limited so long as it has high electrical conductivity and electrochemical corrosion resistance, but aluminum or an aluminum alloy is, for example, preferred. Further, its shape is not particularly limited, but it is necessary not to hinder the impregnation of the electrolyte at the end face of the wound element assembly 53.

Further, to the leads 17A and 17B, the terminal 19 A of a positive electrode and the terminal 19B of a negative electrode are connected, respectively. Such terminal 19A of the positive electrode and the terminal 19B of a negative electrode extend through and fixed to a sealing insulation plate 66 having an electrolyte injection hole 61, and they are air-tightly attached to the sealing insulation plate 66 with an insulating resin.

In such a construction, it is conceivable to make the thickness of the separator 12 as thin as possible as mentioned above in order to accomplish high densification and lower resistance of the electric double layer capacitor, but in such a case, supply of the electrolyte to the processed electrode 41 was likely to be inadequate.

In order to supply the electrolyte sufficiently, it is known to be effective to impregnate a sufficient amount of the electrolyte in pores in the carbonaceous material of the processed electrode 41 in addition to permitting the electrolyte present in the separator 12.

However, with the processed electrode 41, its thickness usually expands beyond the initial thickness upon impregnation of the electrolyte. This is likely to result by increasing the packing amount of the electrode sheet 37A or 37B or by adding carbon black into the processed electrode 41, in order to increase the capacitance of the electric double layer capacitor with the processed electrode 41 as an embodiment of the present invention. Further, such expansion is likely to take place particularly when carbon black having a large electrolyte-retaining amount per unit volume, such as Ketjenblack, is used.

In such a case, by the expansion of the processed electrode 41 itself, the electrolyte tends to hardly penetrate into the interior of the wound element assembly 53, and it tends to be difficult to supply the electrolyte to the processed electrode 41 itself.

Further, the thickness of the processed electrode 41 usually expands also by at least one charging operation, although such may depend also on the type of the carbonaceous material to be used for the electrode sheet 37A or 37B. This is caused by acceleration of the adsorption of the electrolyte in the pores of the carbonaceous material of the processed electrode 41 as the application of the voltage to the processed electrode 41 becomes a driving force. Further, this expansion is likely to take place especially when a readily graphitizable alkali-activated active carbon or the like is used as the carbonaceous material.

Also in such a case, the electrolyte tends to be hardly supplied into the interior of the wound element assembly 53, and impregnation into the processed electrode 41 tends to be inadequate, whereby no adequate performance of the electric double layer capacitor is likely to be obtainable.

However, with the electric double layer capacitor of the present invention, a prescribed space D is formed between the separator 12 and the positive electrode 51A or the negative electrode 51B, whereby impregnation paths of the electrolyte into the positive electrode 51A or the negative electrode 51B are secured. Accordingly, even if expansion of the positive electrode 51A and the negative electrode 51B takes place during the injection of the electrolyte or the subsequent charging operation, the electrolyte can be supplied to the entire wound element assembly 53.

Accordingly, at the time of discharging, the electrolyte is sufficiently present in the vicinity of the positive electrode 51A and the negative electrode 51B, whereby even if an instantaneous large current discharge happens, the voltage drop can be minimized. Further, even at the time of charging, the electrolyte is sufficiently supplied to the positive electrode 51A and the negative electrode 51B, whereby polarization of ions can sufficiently be carried out, and the voltage-maintaining property can be improved.

Further, it does not take time for injection of the electrolyte, whereby the productivity of the electric double layer capacitor will be improved.

Further, with respect to the thicknesses, the expansion degrees, etc. of the positive electrode 51A and the negative electrode 51B, the distance A, the depth D, etc. of the convexoconcave portions 45 and 47 of the processed electrode 41, the thickness, the porosity, the maximum pore diameter (the definition will be described hereinafter), etc., it is advisable to decide their degrees taking into the following points into consideration.

Firstly, the thicknesses of the positive electrode 51A and the negative electrode 51B will be considered.

If the thicknesses of the positive electrode 51A and the negative electrode 51B are too thin, excess spaces are likely to be present between the separator 12 and the positive electrode 51A or the negative electrode 51B even after the positive electrode 51A and the negative electrode 51B have expanded. Accordingly, the distance between the positive electrode 51A and the negative electrode 51B is likely to increase, thus hindering the reduction of the resistance or leading to a decrease of the capacitance density.

On the other hand, if the thicknesses of the positive electrode 51A and the negative electrode 51B are too thick, the space D formed between the separator 12 and the positive electrode 51A or the negative electrode 51B is likely to be closed down when the expansion thereof takes place. Accordingly, during the injection of the electrolyte or the like, impregnation paths of the electrolyte to the positive electrode 51A and the negative electrode 51B are likely to be closed, whereby no adequate supply of the electrolyte is likely to be carried out.

Accordingly, it is advisable to determine the thicknesses of the positive electrode 51A and the negative electrode 51B so that a proper space will be formed between them and the separator 12 when the positive electrode 51A and the negative electrode 51B have expanded. It is particularly preferred that the thicknesses of the electrode sheets 47A and 47B are set to be from 80 to 400 µm.

Now, the degree of expansion of the positive electrode 51A and the negative electrode 51B will be considered.

If the degree of expansion of the positive electrode 51A and the negative electrode 51B is small, an excessive space is likely to be formed between the separator 12 and the positive electrode 51A or the negative electrode 51B depending upon the relation to the thicknesses of the positive electrode 51A and the negative electrode 51B or the depth D of the convexoconcave portion 45 or 47 of the processed electrode 41.

On the other hand, if the degree of expansion of positive electrode 51A and the negative electrode 51B is large, the space D formed between the separator 12 and the positive electrode 51A or the negative electrode 51B is likely to be closed down. Further, the separator 12 may not be durable against the expansion of the positive electrode 51A and the negative electrode 51B, whereby the positive electrode 51A and the negative electrode 51B are likely to break through the separator 12 to cause short-circuiting. Accordingly, it is preferred to adjust so that the thicknesses of the positive electrode 51A and the negative electrode 51B will expand from 1.1 to 1.6 times by the step of impregnating the electrolyte and at least one charging operation.

Now, the distance A and the width B of the convexoconcave portions 45 or 47 of the processed electrode 41 will be considered.

If the distance A between the convexoconcave portions 45 or 47 is too large, the space D is likely to be closed down when the processed electrode 41 is wound up as a wound element assembly 54, whereby it tends to be difficult to supply an adequate amount of the electrolyte to the positive electrode 51A and the negative electrode 51B.

Further, it is not practical to make the distance A between the convexoconcave portions 45 or 47 to be a length shorter than the thickness of the positive electrode 51A and the negative electrode 51B, since such processing itself tends to be difficult. Accordingly, it is advisable to determine the distance A of the convexoconcave portions 45 or 47 within a range where processing is easy at the time of the preparation of the wound element assembly 53 and so that the space D will not be closed down. It is particularly preferred to set the distance A to be at least the thicknesses of the positive electrode 51A and the negative electrode 51B and at most 20 mm.

Further, the width B of the convexoconcave portions 45 or 47 is preferably at least equal to and at most two times of the thicknesses of the positive electrode 51A and the negative electrode 51B, but there is no problem in effects, if it exceeds this range. Further, with respect to the convexoconcave portions 45, they may be constituted solely by convexes 45a without being provided with concaves 45b.

Now, the depth D of the convexoconcave portions 45 or 47 will be considered.

The depth D of the convexoconcave portions 45 or 47 can be calculated by the ratio of the apparent thickness to the initial thickness of the electrode before expansion of the electrode 31 by impregnation of the electrolyte or by charging operation. Here, the ratio of the apparent thickness to the initial thickness of the electrode means the ratio of the stacked thickness of the processed electrode 41 after forming the convexoconcave portions 45 or 47, to the stacked thickness before forming the convexoconcave portions 45 or 47 on the electrode 31.

If this ratio of the apparent thickness to the initial thickness of the electrode is too small (i.e. the ratio is too close to 1), the space D formed between the separator 12 and the positive electrode 51A or the negative electrode 51B will be inadequate, whereby no effect for improving the impregnation property of the electrolyte to the positive electrode 51A and the negative electrode 51B is likely to be obtained. On the other hand, if this ratio is too large, although a sufficient amount of the electrolyte will be supplied to the positive electrode 51A and the negative electrode 51B, the space D from the separator 12 tends to be large even after impregnation of the electrolyte or charging operation, whereby the internal resistance is likely to be high, and the capacitance density is likely to be low. Accordingly, it is preferred to set this ratio to be from 1.01 to 1.20 times.

Now, the thickness or the porosity of the separator 12 will be considered.

As mentioned above, if the thickness of the separator 12 is too thin, the amount of the electrolyte which can be maintained in the separator 12, tends to be inadequate, whereby the internal resistance is likely to increase. Further, if the separator 12 is too thin, short-circuiting is likely to result between the positive electrode 51A and the negative electrode 51B.

Further, if the thickness of the separator 12 is too thick, such will hinder to increase the capacitance of the positive electrode 51A and the negative electrode 51B, whereby it tends to be difficult to improve the capacitance density of the electric double layer capacitor.

On the other hand, if the porosity of the separator 12 is too high, the separator 12 tends to be hardly durable against expansion of the positive electrode 51A and the negative electrode 51B, whereby short-circuiting is likely to result between the positive electrode 51A and the negative electrode 51B.

Further, if the porosity of the separator 12 is too low, the amount of the electrolyte to be impregnated in the separator 12 tends to be small, whereby the internal resistance is likely to be high. Further, the separator 12 is likely to be pressed by expansion of the positive electrode 51A and the negative electrode 51B, and the electrolyte in the separator 12 will be squeezed out, whereby the internal resistance tends to further increase.

Accordingly, it is advisable to set the thickness and the porosity of the separator 12 so as to prevent the increase of the internal resistance and to prevent short-circuiting between the positive electrode 51A and the negative electrode 51B. It is particularly preferred to set the thickness of the separator 12 to be from 10 to 60 $\mu$m and to set the porosity to be from 40 to 85%.

Further, the maximum pore size of the separator 12 will be considered. Here, the maximum pore size means the maximum pore size by the test method stipulated in JIS K3832.

If the maximum pore size of the separator 12 is too large, the positive electrode 51A and the negative electrode 51B are likely to pass through the separator 12 to cause short-circuiting, or metal impurities contained in the positive electrode 51A and the negative electrode 51B are likely to precipitate to cause microscopic short-circuiting. Accordingly, it is preferred to set the maximum pore size of the separator 12 to be at most 1 $\mu$m.

Now, specific examples of the electric double layer capacitor of the present invention will be described.

EXAMPLE 1

A process for preparing an electrode 31 will be described in detail. To prepare the electrode 31, a mixture comprising 80 mass % of steam-activated active carbon powder having a specific surface area of 1,800 m$^2$/g made of a phenol resin as the starting material, as a carbonaceous material, 10 mass % of carbon black as an electroconductive material and 10 mass % of polytetrafluoroethylene as a binder, was prepared. And, to this mixture, propylene glycol was added as a kneading adjuvant, and this mixture was kneaded and then continuously rolled to obtain a long sheet having a thickness of 200 $\mu$m.

Then, this long sheet was continuously dried at 300° C. to remove the kneading adjuvant, followed by further rolling and slitting to obtain electrode sheets 37A and 37B having a thickness of 140 $\mu$m and a width of 100 mm.

Such electrode sheets 37A and 37B were continuously bonded to both sides of a metal current collector foil 33 by means of an electrically conductive adhesive as an adhesive layer 35. As the metal current collector foil 33, aluminum having a thickness of 40 $\mu$m was used, and the electrode sheets 37A and 37B were bonded to the portions having a width of 100 mm, of this metal current collector foil 33.

And, these electrode sheets 37A and 37B, the metal current collector foil 33, etc., were altogether roll-pressed and integrated to obtain a long strip shaped electrode 31 having a thickness of 320 $\mu$m.

Then, a process for preparing the processed electrode 41 will be described in detail.

To prepare the processed electrode 41, the side face of an oval columnar rod was pressed against the long strip shaped electrode 31, whereby groove-shaped recesses as convexo-concave portions 45 having a width B of concaves 45*b* being 0.8 mm and a depth D being 0.2 mm, were formed alternately on the front and rear sides so that the distance A became about 15 mm. By this construction, a processed electrode 41A as generally shown in FIG. 2, will be formed.

Then, a process for preparing a wound element assembly 53 will be described in detail.

To prepare the wound element assembly 53, a separator 12 was sandwiched between a positive electrode 51A and a negative electrode 51B using the processed electrode 41, and the position in the width direction was adjusted so that the separator 12 protrude from the width of the positive electrode 51A and the negative electrode 51B by 4 mm on the left and right hand sides, respectively. And the one having the position so adjusted was wound up on a winding core having a diameter of 8 mm to prepare a wound element assembly 53 having a diameter of 40 mm and a length of 108 mm.

Here, as the separator 12, one obtained by slitting a porous film made of an ultrahigh molecular weight polyethylene and having a thickness of 40 $\mu$m, a porosity of 80% and a maximum pore size of 0.8 $\mu$m by the test method stipulated in JIS K3832, with a width of 108 mm, was used.

Now, a process for preparing the cylindrical cell 60 will be described.

To prepare the cylindrical cell 60, the wound element assembly 53 was contained in an aluminum cylindrical casing 15 having a height of 120 mm, a diameter of 41 mm and a wall thickness of 0.4 mm. And, a terminal 19A of the positive electrode and a terminal 19B of the negative electrode were air-tightly attached with an insulating resin to a sealing insulation plate 66 made of aluminum and having an electrolyte injection hole 61. And, to such a terminal 19A of the positive electrode and a terminal 19B of the negative electrode, leads 17A and 17B were, respectively, welded by supersonic welding, and then, the sealing insulation plate 66 was fixed in the cylindrical casing 15, followed by laser welding to seal the cylindrical casing 15.

Then, in a state where the electrolyte injection hole 61 of the sealing insulation plate 66 was opened, vacuum drying treatment was carried out for 72 hours in an atmosphere of 90° C. The interior of the element was vacuumed to 30 Pa, and an electrolyte having 1.5 mol/kg of $(C_2H_5)_3(CH_3)NBF_4$ dissolved in propylene carbonate, was injected from the electrolyte injection hole 61 under atmospheric pressure. And after expiration of 30 minutes, an excess electrolyte was removed, and a safety valve was put on the electrolyte injection hole 61 for air-tight sealing.

Thus, a cylindrical cell 60 was prepared as the electric double layer capacitor.

EXAMPLE 2

With the electrode 31 in Example 1, an angular hard plate having a prescribed isosceles triangle was pressed against this electrode 31 to bend it to form convexoconcave portions 47 alternately on the front and rear sides and to make the distance A to be 10 mm. By this construction, a processed electrode 41B as generally shown in FIG. 3, will be formed. Otherwise, preparation was carried out in the same manner as in Example 1.

EXAMPLE 3

Preparation was carried out in the same manner as in Example 1 except that in the electrode 31 in Example 1, an alkali-activated active carbon powder having a specific surface area of 800 m$^2$/g and made of petroleum pitch as the starting material, was used as the carbonaceous material, and a non-woven fabric made of a polyethylene terephthalate and having a thickness of 50 µm, a porosity of 60% and a maximum pore diameter of 0.9 µm by the test method stipulated in JIS K3832, was used as the separator 12.

EXAMPLE 4

Preparation was carried out in the same manner as in Example 2 except that in the electrode 31 in Example 2, an alkali-activated active carbon powder having a specific surface area of 800 m$^2$/g and made of petroleum pitch as the starting material, was used as the carbonaceous material, and a non-woven fabric made of a polyethylene terephthalate and having a thickness of 50 µm, a porosity of 60% and a maximum pore diameter of 0.9 µm by the test method stipulated in JIS K3832, was used as the separator 12.

EXAMPLE 5

Preparation was carried out in the same manner as in Example 1 except that in Example 1, a cellulose paper prepared from a solvent spinning rayon (Rayocel, tradename) and having a thickness of 50 µm, a porosity of 55% and a maximum pore size of 0.7 µm by the test method stipulated in JIS K3832, was used as the separator 12.

EXAMPLE 6

Preparation was carried out in the same manner as in Example 1 except that in the processed electrode 41 in Example 1, the convexoconcave portions 45 were formed so that the distance A would be 30 mm.

EXAMPLE 7

Preparation was carried out in the same manner as in Example 1 except that a non-woven fabric made of a polyethylene terephthalate and having a thickness of 60 µm, a porosity of 80% and a maximum pore size of 2.5 µm by the test method stipulated in JIS K3832, was used as the separator 12.

COMPARATIVE EXAMPLE 1

Preparation was carried out in the same manner as in Example 1 except that no convexoconcave portions 45 were formed in the electrode 31 of Example 1.

COMPARATIVE EXAMPLE 2

Preparation was carried out in the same manner as in Example 1 except that in the electrode 31 in Example 1, a graphite powder was used instead of the carbon black, as the conductive material.

In the foregoing Examples 1 to 7 and Comparative Examples 1 and 2, the following measurements were respectively carried out.

Measurement 1

Prior to injection of the electrolyte, the cross-section of the wound element assembly 53 was observed, and the thickness of the stack at the portion having the positive electrode 51A/the separator 12/the negative electrode 51B/the separator 12 stacked in this order, was measured.

Measurement 2

In addition to the measurement 1, the ratio of the apparent thickness to the initial thickness of the electrode was calculated.

Measurement 3

Then, the amount of the electrolyte at the time when the cylindrical cell 60 was obtained, was measured.

Measurement 4

Further, the cylindrical cell 60 prepared separately from the one used in Measurement 3, was disassembled, and the initial expansion rate was measured.

Here, the initial expansion rate is a ratio of the thickness of the positive electrode 51A and the negative electrode 51B after injecting the electrolyte to the thickness of the positive electrode 51A and the negative electrode 51B before injection of the electrolyte.

Measurement 5

Then, using a cylindrical cell 60 prepared separately from the one used in Measurement 3 or Measurement 4, constant voltage charging was carried out at a voltage of 2.6 V for 30 minuets, whereupon discharging was carried out at a constant current of 30 A to a voltage of 1.0 V.

At that time, the capacitance of the entire cylindrical cell 60 was obtained from the inclination of the discharge curve from a voltage of 2.6 V to a voltage of 1.0 V.

Measurement 6

Further, in addition to Measurement 5, the internal resistance was calculated from the voltage drop at the initial stage of discharge.

Measurement 7

Further, in addition to Measurement 6, the retention voltage after being left for 72 hours in an open-circuit state after constant voltage charging at a voltage of 2.6 V for 24 hours, was measured.

Measurement 8

Then, the cylindrical cell 60 after completion of Measurement 7 was disassembled, and the thicknesses of the positive electrode 51A and the negative electrode 51B were measured, and the expansion rate was measured.

This expansion rate will be referred to as the expansion rate after charging/discharging against the initial expansion rate by Measurement 4.

The results of the foregoing Measurements 1 to 8, are shown in Table 1.

TABLE 1

| | Measurement 1 Stacked thickness (μm) | Measurement 2 Ratio of the apparent thickness to the initial thickness of the electrode | Measurement 3 Amount of the electrolyte (g) | Measurement 4 Initial expansion rate | Measurement 5 Capacitance (F) | Measurement 6 Resistance (mΩ) | Measurement 7 Retention voltage (V) | Measurement 8 Expansion rate after charging and discharging |
|---|---|---|---|---|---|---|---|---|
| Ex. 1 | 735 | 1.021 | 111 | 1.13 | 1650 | 2.21 | 2.444 | 1.15 |
| Ex. 2 | 760 | 1.056 | 115 | 1.13 | 1550 | 2.41 | 2.451 | 1.15 |
| Ex. 3 | 780 | 1.054 | 109 | 1.11 | 2210 | 3.22 | 2.391 | 1.48 |
| Ex. 4 | 790 | 1.068 | 112 | 1.11 | 2180 | 3.31 | 2.401 | 1.51 |
| Ex. 5 | 780 | 1.055 | 117 | 1.13 | 1570 | 2.33 | 2.460 | 1.16 |
| Ex. 6 | 725 | 1.007 | 100 | 1.11 | 1619 | 3.53 | 2.055 | 1.12 |
| Ex. 7 | 736 | 1.022 | 113 | 1.13 | 1650 | 2.18 | 0.507 | 1.15 |
| Comp. Ex. 1 | 720 | 1.000 | 79 | 1.11 | 1412 | 5.42 | 0.221 | 1.11 |
| Comp. Ex. 2 | 737 | 1.024 | 75 | 1.01 | 890 | 20.8 | 0.011 | 1.05 |

In Table 1, from the results of measurements of Example 1 and Comparative Example 1, it is evident that if the ratio of the apparent thickness to the initial thickness of the electrode is 1.000 (the same as the conventional one having no convexoconcave portions 45 in the processed electrode 41), the resistance value is increased. Further, it is evident that also in the retention voltage, a decrease in the voltage retention properties is brought about. It is considered that in Comparative Example 1, since no space D was formed between the separator 12 and the positive electrode 51A or the negative electrode 51B, the impregnation property of the electrolyte to the positive electrode 51A and the negative electrode 51B became poor, whereby an increase of the resistance or a decrease of the voltage-retention properties was brought about.

Further, from the results of measurements in Example 1 and Example 2, it is evident that if the distance A of the convexoconcave portions 45 or 47 in the processed electrode 41 is within a range of from 10 to 15 mm, the characteristics of the electric double layer capacitor are excellent. Further, it is evident that even if the shape of the cross-section of the convexoconcave portion 45 or 47 is a semielliptic shape as in the processed electrode 41A or a rectangular shape as in the processed electrode 41B, the characteristics are excellent.

On the other hand, from the results of measurement in Example 6, it is evident that if the distance A of the convexoconcave portions 45 is 30 mm, the resistance value tends to increase as compared with Example 1. It is considered that in Example 6, the distance A of the convexoconcave portions 45 was so wide that at the time of preparation of the wound element assembly 53, the space D between the separator 12 and the positive electrode 51A or the negative electrode 51B was closed down, whereby it was impossible to supply an adequate amount of the electrolyte to the positive electrode 51A and the negative electrode 51B, and the increase of the resistance, etc., were brought about.

Further, it is evident that in Example 4 wherein the shape, the distance A, etc. of the convexoconcave portions 47 in Example 2 and the shape of the separator 12, etc. in Example 3 are combined, no substantial difference in the characteristics is observed as compared with Examples 1 to 3.

On the other hand, from the results of measurement in Example 7, it is evident that if the maximum pore size of the separator 12 is large, the voltage-retention properties tend to decrease as compared with Example 1. It is considered that in Example 7, the maximum pore size of the separator was so large that the positive electrode 51A and the negative electrode 51B tended to pass though the separator 12 to cause short-circuiting, or metal impurities contained in the positive electrode 51A and the negative electrode 51B precipitated to cause microscopic short-circuiting, whereby the retention voltage decreased.

Further, from the results of measurements in Example 1 and Comparative Example 2, it is evident that when graphite powder is employed as the electroconductive material for the electrode sheets 37A and 37B, the resistance value tends to increase as compared with Example 1. Further, it is evident that the capacitance and the retention voltage are also poor as compared with Example 1.

Further, as compared with Example 1, in Comparative Example 2, the amount of the electrolyte is small. It is considered that in Comparative Example 2, since the material for the electroconductive material was changed, whereby the electroconductivity of the electrode sheets 37A and 37B decreased, whereby it was impossible to retain the electrolyte in an amount required for polarization in the positive electrode 51A and the negative electrode 51B, whereby the increase of the resistance or the decrease of the voltage retention property was brought about.

Especially from the results of measurements in Examples 1 to 5, it is evident that when the specific surface area of the carbonaceous material for the electrode sheets 37A and 37B is from 800 to 1,800 m²/g, the thickness of the separator 12 is from 40 to 50 μm, the porosity is from 60 to 80%, and the maximum pore size is from 0.8 to 0.9 μm, the characteristics of the electric double layer capacitor are excellent. Accordingly, the electric double layer capacitors of Examples 1 to 5 are particularly suitable as electric double layer capacitors for application primarily for a large capacitance and large current, particularly for a discharge capacitance of from 10 to 20,000 F or a discharge current of from 1 to 1,000 A.

In the foregoing Examples, Examples of electric double layer capacitors employing cylindrical cells 60, are shown. However, these examples are likewise applicable to electric double layer capacitors employing rectangular cells to obtain similar effects.

As described in the foregoing, according to the present invention, protruded portions or bent portions are formed on the electrode, so that a space is formed between the separator and the electrode, whereby the internal resistance of the electric double layer capacitor can be reduced, its capacitance density can be increased, and its productivity can be maintained excellently.

What is claimed is:

1. An electric double layer capacitor having contained in a casing an electrolyte, a positive electrode and a negative electrode each being an electrode containing carbon black, to form an electric double layer at the interface with the electrolyte, and a separator interposed between the positive electrode and the negative electrode, wherein at least one electrode of the positive electrode and the negative electrode has protruded portions or bent portions formed continuously in the height direction against the bottom face of the casing, and a space due to the height of the protruded portions or the bent portions is formed between said at least one electrode and the separator, wherein a plurality of such positive electrodes and negative electrodes are alternately stacked with the separator between them, or the positive electrode and the negative electrode each having a long strip shape, are wound with the separator between them, and contained in the casing having a bottomed cylindrical or rectangular shape.

2. The electric double layer capacitor according to claim 1, wherein on both electrodes of the positive electrode and the negative electrode, the protruded portions or the bent portions are formed continuously in the height direction against the bottom face of the casing.

3. The electric double layer capacitor according to claim 1, wherein the protruded portions or the bent portions are ones having said at least one electrode deformed on one side or both sides, and they are formed in a plurality at every predetermined distance in a direction perpendicular to the height direction.

4. The electric double layer capacitor according to claim 1, wherein the electrode is one comprising a metal current collector and an electrode sheet containing a carbonaceous material as the main component and having a thickness of from 80 to 400 $\mu$m, bonded with an adhesive layer to at least one side of the metal current collector.

5. The electric double layer capacitor according to claim 4, wherein the electrode sheet is bonded with the adhesive layer to each side of the metal current collector.

6. The electric double layer capacitor according to claim 5, wherein the electrode sheet contains from 5 to 30 mass% of carbon black.

7. The electric double layer capacitor according to claim 4, wherein the electrode sheet contains from 5 to 30 mass% of carbon black.

8. The electric double layer capacitor according to claim 1, wherein the separator has a thickness of from 10 to 60 $\mu$m and a porosity of from 40 to 85%.

9. The electric double layer capacitor according to claim 8, wherein the electrolyte is a non-aqueous electrolyte containing a quaternary onium salt as a solute.

10. The electric double layer capacitor according to claim 1, wherein the electrolyte is a non-aqueous electrolyte containing a quaternary onium salt as a solute.

11. The electric double layer capacitor according to claim 1, wherein the electrolyte is a non-aqueous electrolyte containing a quaternary onium salt as a solute.

* * * * *